United States Patent [19]
Bubeck

[11] Patent Number: 5,950,584
[45] Date of Patent: Sep. 14, 1999

[54] SPARK PLUG FOR FORMING A SPARK TO JUMP BETWEEN TWO ELECTRODES

[75] Inventor: Guenther Bubeck, Schorndorf, Germany

[73] Assignee: Daimler-Benz Aktiengesellschaft, Germany

[21] Appl. No.: 08/964,216

[22] Filed: Nov. 4, 1997

[30] Foreign Application Priority Data

Nov. 4, 1996 [DE] Germany .......................... 196 45 385

[51] Int. Cl.⁶ .................................................. H01T 13/20
[52] U.S. Cl. ............................... 123/169 EL; 123/169 E; 123/169 MG; 313/131
[58] Field of Search .................................. 123/295, 298, 123/305, 169 EL, 169 E, 169 MG; 313/118, 123, 131 R, 141

[56] References Cited

U.S. PATENT DOCUMENTS

| 4,092,558 | 5/1978 | Yamada . |
| 4,307,316 | 12/1981 | McKechnie . |
| 4,439,707 | 3/1984 | Hattori et al. . |
| 4,730,582 | 3/1988 | Lindsay . |
| 4,748,947 | 6/1988 | LoRusso et al. . |
| 4,901,687 | 2/1990 | Jones . |

FOREIGN PATENT DOCUMENTS

| 1554349 | 12/1968 | France . |
| 846 638 | 8/1952 | Germany . |
| 2 315 629 | 10/1973 | Germany . |
| 33 09 256 C2 | 10/1983 | Germany . |
| 43 24 642 A1 | 1/1994 | Germany . |
| 4-138685 | 5/1992 | Japan . |
| 764028 | 1/1955 | United Kingdom . |
| 752675 | 3/1955 | United Kingdom . |
| 906620 | 7/1961 | United Kingdom . |
| 942973 | 5/1962 | United Kingdom . |
| 1 215 082 | 1/1968 | United Kingdom . |
| 1 521 313 | 9/1975 | United Kingdom . |
| 2 149 852 | 6/1985 | United Kingdom . |
| 2 280 932 | 2/1995 | United Kingdom . |

Primary Examiner—Erick R. Solis
Attorney, Agent, or Firm—Evenson, McKeown, Edwards & Lenahan, P.L.L.C.

[57] ABSTRACT

A spark plug for forming a spark that jumps between two electrodes has an insulating body surrounded by a housing with a ground electrode. The insulating body has a center electrode therein, which projects beyond the ground electrode in the axial direction.

12 Claims, 3 Drawing Sheets

SPARK PLUG FOR FORMING A SPARK TO JUMP BETWEEN TWO ELECTRODES

BACKGROUND AND SUMMARY OF THE INVENTION

This application claims the priority of German patent document 196 45 385.2, the disclosure of which is expressly incorporated by reference herein.

The invention relates to a spark plug which generates a spark that jumps between two electrodes.

Spark plugs have two electrodes, between which a spark jumps upon application of an ignition voltage that exceeds the electrical spark-over voltage, to ignite a flammable gas mixture surrounding the electrodes. Usually a ground electrode of the spark plug is formed on an electrically conducting housing that has an insulating body with a center electrode therein. In known spark plugs, the ground electrode is separated from the center electrode by a short distance (approximately 0.4 to 0.8 mm). When the spark voltage is applied, a spark that causes the mixture to ignite jumps between the center electrode and the ground electrode. Because of the narrow spark gap between the electrodes, known spark plugs can reliably ignite only flammable monatomic and homogenous mixtures. That is, if an inhomogeneous gas mixture with local differences in concentration is present, no ignition can occur if the spark jumps in a portion of the mixture where there is a surplus of air and a shortage of the fuel component.

The disadvantages of the narrow spark gap between the electrodes of conventional spark plugs are manifested in the operation of direct-injected gasoline engines with charge stratification, such as those disclosed for example in German patent document DE-OS 43 24 642 A1. In this case, a mixture cone is formed from a conical fuel stream from an injector, with concentration gradients that decrease outwardly, and the electrodes of the spark plugs project into the mixture cone. An ignitable mixture is present at the electrodes of the spark plug in the outer area of the mixture cone, but this mixture is leaner than the mixture composition near the injector, so that fuel consumption advantages and lower pollutant emissions from the engine are achieved during subsequent stratified combustion. Variations in the injector nozzle as a result of manufacturing methods, or even deposits which develop with increasing operating time of the engine, cause a skeining of the fuel stream, so that fluctuations in concentration occur especially in the jacket area of the mixture cone. If the fuel concentration of the mixture present at the electrodes at the moment of injection is below the limit of ignitability, the spark that jumps between the electrodes cannot initiate the combustion process, causing a misfire. Such misfires should be avoided at all costs because of the rough engine operation that results, as well as the high pollutant emissions from the engine.

An object of the present invention therefore, is to provide a spark plug of the type described above which achieves improved combustion of flammable gas mixtures with locally different mixture concentrations.

Another object of the invention to locate the spark plug in such fashion in a gasoline engine, especially an engine with charge stratification, that its normal operation is improved.

These and other objects are achieved by the spark plug according to the invention, in which the center electrode projects beyond the ground electrode in the axial direction, so that a long spark gap can be formed that matches the distance between the electrodes. With this configuration, flammable gas mixtures with locally different concentrations can be ignited reliably. The spark passes through the mixture on a precisely defined path between the electrodes, so that it reliably encounters at least a partial volume of the mixture which is within the ignition limits. The path of the spark from the center electrode to the ground electrode then passes close to the sections of the spark plug that are heated to the greatest extent, so that the ignitability of the portion of the mixture that is located between the electrodes is improved because of the higher temperature.

A longer yet controlled spark path can be achieved because the insulating body extends in the axial direction of the center electrode for at least the same distance as the ground electrode on the housing. Although the adjacent insulating body itself is not a conductor, because of its mass and the high ignition voltage the spark will first jump to the insulating body and will be conducted from there to the ground electrode. Thus two partial spark paths are formed which together correspond to the total spark gap between the electrodes. Advantageously the insulating body is surrounded by the housing of the spark plug with a radial gap, forming a chamber that is open to the electrodes, so that greater heating of the insulating body and the center electrode enclosed therein is achieved. In addition, the chamber has a heat-insulating effect and prevents the insulating body from being cooled as a result of the conduction of heat through the housing.

The spark plug is preferably used for igniting mixtures in gasoline engines, with at least one spark plug having its electrodes projecting into the combustion chamber of each cylinder and thus into the mixture contained in said cylinder. The housing of the spark plug is electrically connected with the cylinder head, thus ensuring the conduction of the igniting spark in addition to holding the spark plug in place. If the engine operates with internal carburetion and charge stratification, the stratified inhomogeneous fuel/air mixture in the combustion chamber can be ignited reliably. Advantageously, at least the center electrode penetrates the outer jacket of a mixture-guiding stratification cone each time fuel is injected into the combustion chamber. The stratification cone is formed by the conical stream during injection by an injector located in the cylinder head, and, due to the stratification, has $\lambda$ values that increase toward the outside starting at the center of the cone with the highest fuel concentration.

In the vicinity of the outer jacket, the mixture composition is within the ignition limits, with the nature of stratified charge operation being such that the skeining of the conical stream that is injected produces a lean mixture locally in the outer jacket of the mixture cone, such composition being below the ignition limit. These nonflammable partial volumes with high $\lambda$ values are small however, and because of the long spark travel distance of the spark plug, starting from a center electrode that projects into the mixture cone, the ignition spark that jumps between the electrodes during each ignition process passes through a partial volume of the mixture with $\lambda$ values within the ignition limits. If the center electrode corresponding to the location of the spark plug in the cylinder head is pointed at the axis of symmetry of the mixture cone, the spark gap extends between the electrodes in a mixture area with the largest possible concentration gradient, and stratified combustion can be triggered extremely reliably by the igniting sparks.

Other objects, advantages and novel features of the present invention will become apparent from the following detailed description of the invention when considered in conjunction with the accompanying drawings.

DETAILED DESCRIPTION OF THE DRAWINGS

Figure 1:
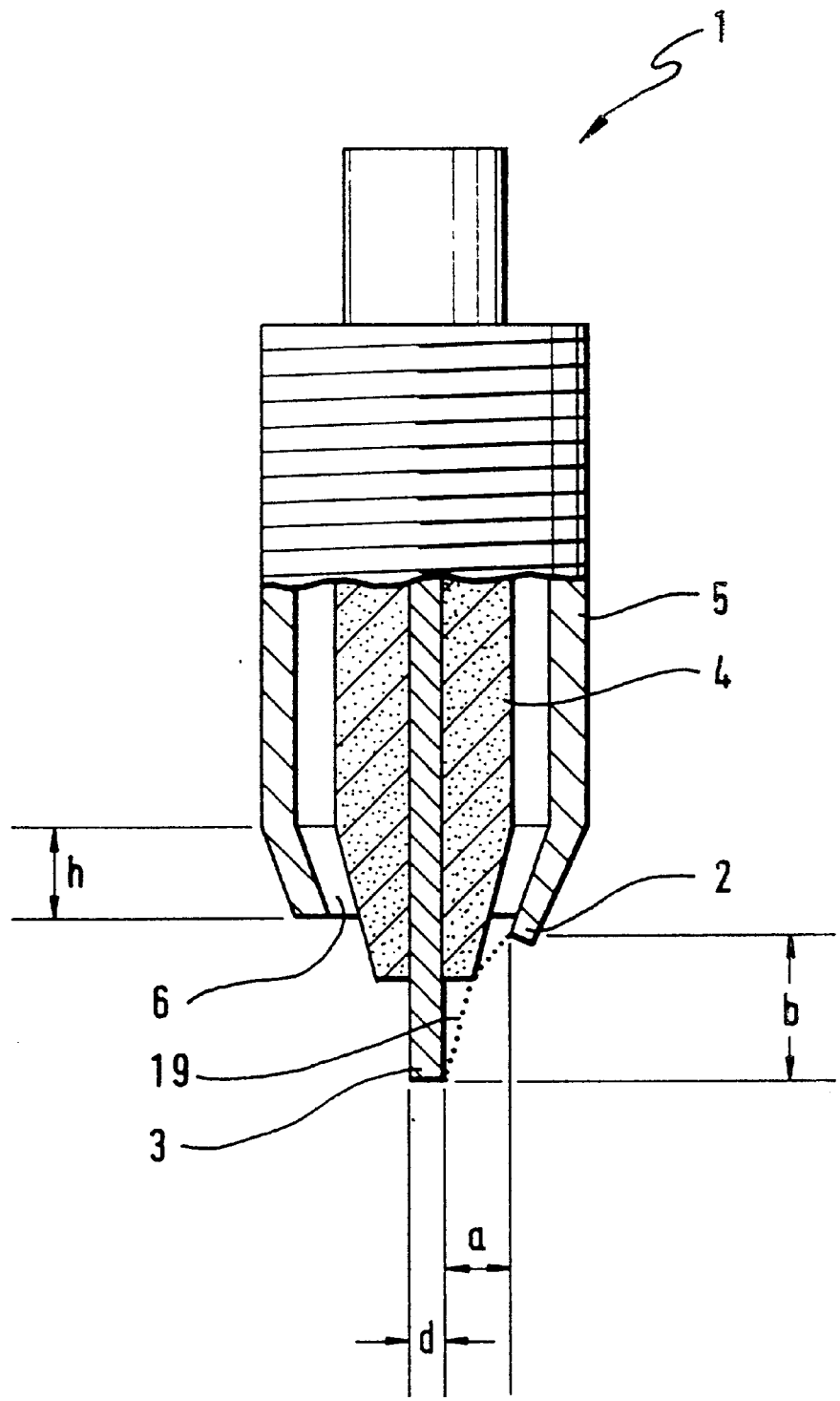
FIG. 1 is a schematic partially cut-away view of a spark plug according to the invention.

The spark plug 1 shown in FIG. 1 has a center electrode 3 passing through an insulating body 4. Insulating body 4 is surrounded by a housing 5, which is rotationally symmetrical with respect to the axis of center electrode 3, with a space between the insulating body and the housing that forms a chamber 6 which is open toward the center electrode 3. The housing has a ground electrode 2 in its end section. Center electrode 3 extends beyond ground electrode 2 in the axial direction by an amount b that determines the axial length of a spark gap 19 to be followed by an igniting spark jumping between the ignitging electrodes 2, 3 after application of an igniting voltage thereto. Insulating body 4 tapers toward center electrode 3 and projects beyond ground electrode 2. The mass of insulating body 4 and the impurities, deposits, or the like that are formed on its surface cause a situation in which the igniting spark initially jumps to the forward end of insulating body 4, and from there passes through a second partial section to ground electrode 2. As a result, the complete spark gap 19 through which the spark travels consists of two partial spark gaps, namely from center electrode 3 to the end section of insulating body 4 on the one hand, and from there to ground electrode 2 on the other hand. Despite its great length, the spark gap thus can be controlled.

Spark plug 1 is therefore particularly suitable for igniting flammable mixtures with locally different mixture concentrations, since due to the long spark gap 19 for the igniting spark that jumps between electrodes 2 and 3, it passes through large portions of the mixture to be ignited. Depending on the axial distance b and the radial distance a of electrodes 2 and 3, spark plug 1 offers a large ignition area that increases the reliability of ignition because the presence of an ignitable mixture in only a portion of spark gap 19 is sufficient to trigger combustion of the mixture.

The heat created during combustion of the mixture is transmitted through chamber 6 to ceramic insulating body 4, so that the igniting ability of spark plug 1 increases with temperature. Moreover, it is desirable to have a high temperature for the center electrode and the adjacent portion of insulating body 4, since deposits of completely burned fuel preferably form on surfaces with low temperatures. The axial distance h of housing 5 and hence of chamber 6 from the covering of insulating body 4 therefore significantly influences the ignition properties of spark plug 1. The distance h of chamber 6 in the covering provided for purposes of heat insulation over the end portion of insulating body 4 to be heated is therefore as large as possible and is geometrically limited by the arrangement of ground electrode 2 to achieve a long spark gap 19. Diameter d of center electrode 3 is small in order to prevent heat loss upon contact with the mixture (which is cool before combustion) due to the small electrode mass. In particular, during carburetion with liquid fuel and with a small diameter d, the cooling of center electrode 3 by wetting and evaporation can be limited. For advantageous use of spark plug 1 for igniting fuel/air mixtures in gasoline engines, a diameter d of center electrode 3 of 0.9 mm is proposed.

Figure 2:
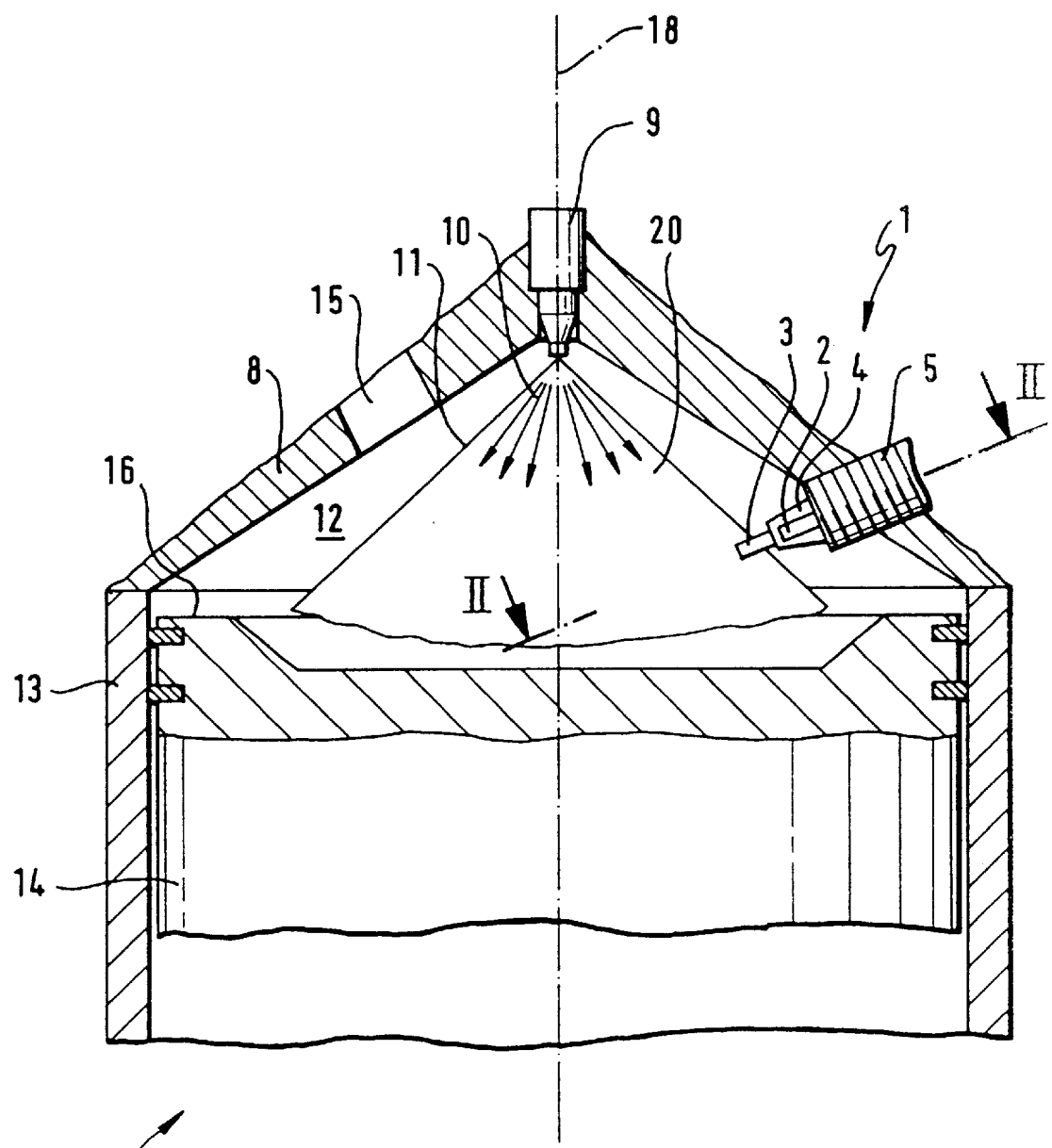
FIG. 2 is a section of a direct-injected gasoline engine with a spark plug to ignite the mixture.

FIG. 2 shows a cylinder 13 with a piston 14 of a gasoline engine 7 located therein, in which cylinder a combustion chamber 12 is delimited by a piston crown 16 and a roof-shaped cylinder head 8. At the peak of cylinder head 8, on the axis of symmetry 18 of cylinder 13, an injector 9 terminates in combustion chamber 12. During stratified charge operation of engine 7, the injector injects fuel during the compression stroke of piston 14. The combustion air required for internal mixture formation can be supplied through an inlet channel 15 that passes through cylinder head 8 into combustion chamber 12. The fuel can be injected by injector 9 in a conical stream 10, so that the fuel/air mixture can be prepared for stratified combustion in a stratified cone 20 with λ values that increase outward, in other words increasingly lean mixture ratios. Mixture concentrations within the ignition limits of a specific λ window exist in an outer jacket 11 of stratified cone 20, while a mixture that is too rich (low λ values) is located below the lower spark plug, within stratified cone 20, and a lean mixture (high λ values and an air surplus being difficult to ignite) is located outside outer jacket 11 and above the spark plug. Because of the skeining of conical stream 10 it is possible for small partial volumes of the mixture to form in outer jacket 11 of mixture cone 20 whose λ values lie outside the ignition limits.

This stratified combustion chamber charge is ignited by the spark plug 1 as shown in FIG. 1. Housing 5 of spark plug 1 is connected with cylinder head 8, with electrodes 2 and 3 projecting into combustion chamber 12. The cylindrical housing 5 of spark plug 1 can be provided with a thread in known fashion for connection with cylinder head 8, such thread being screwable into a matching threaded bore in cylinder head 8. Housing 5 consists of an electrically conducting material, preferably steel, so that a spark jumping from center electrode 3 to ground electrode 2 formed on housing 5 is conducted through the thread into cylinder head 8. During carburetion, the center electrode penetrates outer jacket 11 and projects into the interior of mixture jacket 20. Both center electrode 3 and insulating body 4 that surrounds the center electrode project in the axial direction, in other words, into mixing cone 20, beyond ground electrode 2. When the ignition voltage is applied, a spark jumps from center electrode 3 to ground electrode 2. Thus, its path across its long spark gap over insulating body 4 covers a large portion of mixture cone 20, with different λ values, in the radial direction. Even with locally present nonignitable partial volumes in outer jacket 11, reliable ignition of the combustion chamber charge is achieved by including several mixture volumes of different concentrations.

Center electrode 3 is closer to injector 9 than ground electrode 2, so that the acquisition range of components of mixture cone 20 with different λ values is expanded. The rotationally symmetric spark plug 1 has a marking to indicate the circumferential position. When spark plug 1 is installed in cylinder head 8, the marking can be seen from the end of the spark plug opposite the electrodes. Spark plug 1 can thus be brought in simple fashion into the desired installation position in which ground electrode 2 faces away from injector 9.

Figure 3:
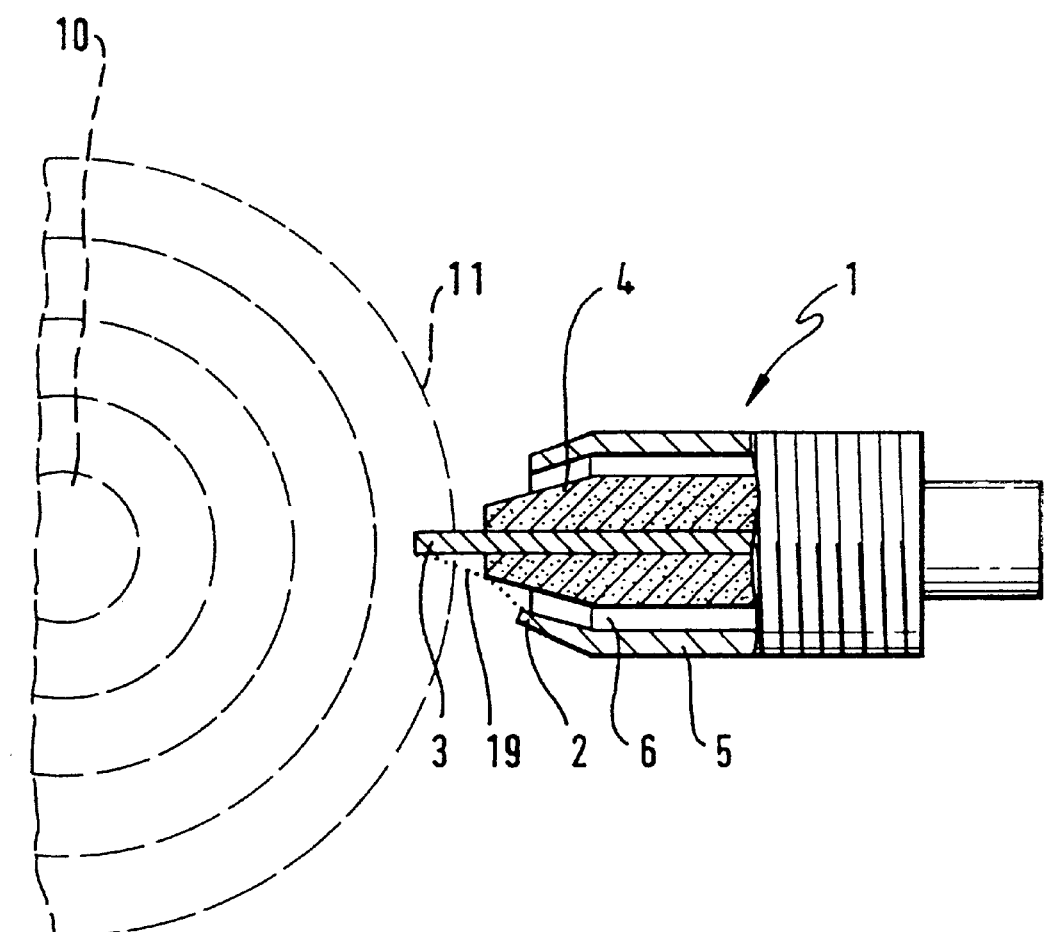
FIG. 3 is a section through the mixing cone and the spark plug projecting into the mixture cone along III—III in FIG. 2.

In the advantageous installation position of spark plug 1, ground electrode 2 is separated from central electrode 3 in the circumferential direction of outer jacket 11 of mixture cone 10, as is evident from FIG. 3 in particular. Spark gap 19 of a spark that jumps from insulating body 4 to ground electrode 2 when an ignition voltage is applied to center electrode 3 is therefore located in a plane that is perpendicular to the cylinder axis and also to the injection direction. As a result of the advantageous large acquisition area of various λ values in the radial direction of mixture cone 20, the stability of the position of spark gap 19 is increased by this transverse arrangement of ground electrode 2 relative to mixture cone 20.

Chamber 6 delimited by housing 5 of spark plug 1 promotes the heating of an insulating body made of a ceramic material, which body provides heat insulation for chamber 6. An operating temperature can be reached, especially at center electrode 3 and in the end portion of insulating body 4, that prevents the deposition of combustion residues in these areas of spark plug 1 by deposit scavenging. Spark plug 1 can be heated by chamber 6 to an operating temperature that reliably prevents coking of the spark plug, especially in stratified charge operation of a gasoline engine at low combustion chamber temperatures. The center electrode, which is wetted during fuel injection by liquid fuel and thereby cooled, is protected against harmful coking by the reduced heat loss. Center electrode 3 is made as thin as possible in order to prevent heat loss as the result of its small size and also to offer less of an impact surface for wetting by the injected fuel stream. A diameter of 0.9 mm is proposed for center electrode 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A spark plug for forming a spark which jumps between two electrodes, comprising:

a spark plug housing;

a central electrode disposed in said housing;

an insulating body surrounding at least a portion of the central electrode with a tip area of said central electrode extending axially beyond on axial extremity of said insulating body;

a around electrode formed on said housing, with said central electrode projecting beyond the ground electrode in an axial direction of said central electrode; and a spark path between said central electrode and said ground electrode, said spark path comprising at least two sequentially disposed air gaps, a first air gap between said tip area and said insulating body, and a second air gap between said insulating body and said ground electrode.

2. The spark plug according to claim 1, wherein the housing surrounds insulating body with a gap, forming a chamber that is open to the electrodes.

3. The spark plug according to claim 1, wherein the insulating body extends in the axial direction of central electrode for at least the same distance as ground electrode.

4. The spark plug according to claim 1, wherein the spark plug is rotationally symmetrical and has a marking that can be detected at least from an end of spark plug that is opposite electrodes, to indicate a circumferential position of the spark plug.

5. A gasoline engine comprising:

at least one cylinder which forms a combustion chamber delimited by a cylinder head and a piston arranged in said at least one cylinder;

said at least one cylinder having a spark plug connected with said cylinder head thereof, which spark plug has a spark plug housing;

a ground electrode formed on said housing;

a central electrode disposed in said housing and projecting beyond the ground electrode in an axial direction of said central electrode;

an insulating body surrounding at least a portion of the central electrode; and a spark oath between said central electrode and said ground electrode, said spark oath comprising at least two sequentially disposed air gaps, a first air gap between said tip area and said insulating body, and a second air gap between said insulating body and said around electrode;

wherein the central electrode and the ground electrode of said spark plug project into the combustion chamber and extend into a region of said combustion chamber wherein an air/fuel mixture can be compressed by the piston.

6. The engine according to claim 5, further comprising a fuel injector situated in said cylinder head, which fuel injector, during stratified charge operation of the engine, injects fuel into said combustion chamber in a conical stream which forms a stratified conical mixturer of combustion air and fuel, wherein at least the center electrode projects through an outer jacket and into an interior of said stratified conical mixture.

7. The engine according to claim 6, wherein a longitudinal axis of center electrode extends toward a center portion of the combustion chamber and intersects an axis of symmetry of stratified cone.

8. Engine according to claim 6, wherein the center electrode is located closer to injector than is the ground electrode.

9. The engine according to claim 8, wherein the ground electrode is spaced in the circumferential direction of outer jacket of stratified cone from center electrode.

10. A spark plug for a combustion engine, comprising:

a spark plug housing;

a ground electrode formed on said housing and projecting from an open end of said housing in an axial direction thereof;

a central electrode disposed in said housing along an axial direction thereof;

an insulating body surrounding at least a portion of said central electrode and projecting from said open end of said housing in said axial direction, beyond said ground electrode, with a tip area said central electrode extending in said axial direction, beyond said insulating body; and a spark path between said central electrode and said ground electrode, said spark path comprising at least two sequentially disposed air gaps, a first air gap between said tip area and said insulating body, and a second air gap between said insulating body and said ground electrode.

11. A spark plug for a combustion engine comprising:

a spark plug housing having a ground electrode formed thereon;

a central electrode disposed in said housing; and an insulating body surrounding said central electrode;

wherein said spark plug has a sparking path which comprises two sequentially disposed air gaps, a first air gap between said ground electrode and said insulating body, and a second air gap between said insulating body and a tip of said central electrode.

12. A spark plug comprising:

a ground electrode;

a central electrode which is surrounded by an insulating body; and a sparking path comprising two sequentially disposed sparking air gaps: a first sparking air gap defined by a separation between said ground electrode and said insulating body, and a second sparking air gap defined by a separation between said insulating body and a tip of said central electrode.

* * * * *